May 5, 1959  R. B. GOODMAN ET AL  2,884,846
COUPLING AND MIXING CHAMBER FOR AN AIRCRAFT
AIR CONDITIONING SYSTEM
Filed Dec. 13, 1956  2 Sheets-Sheet 1
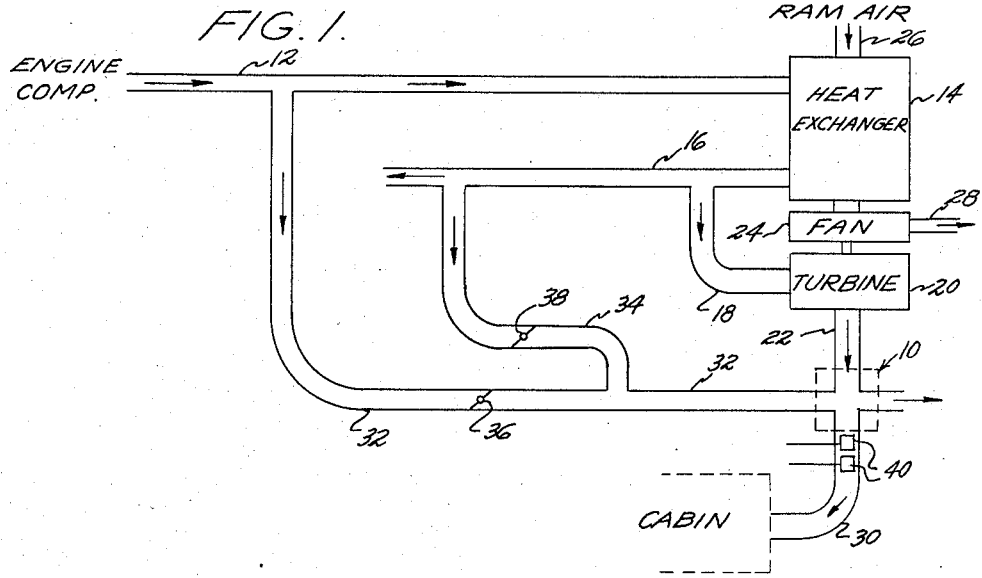
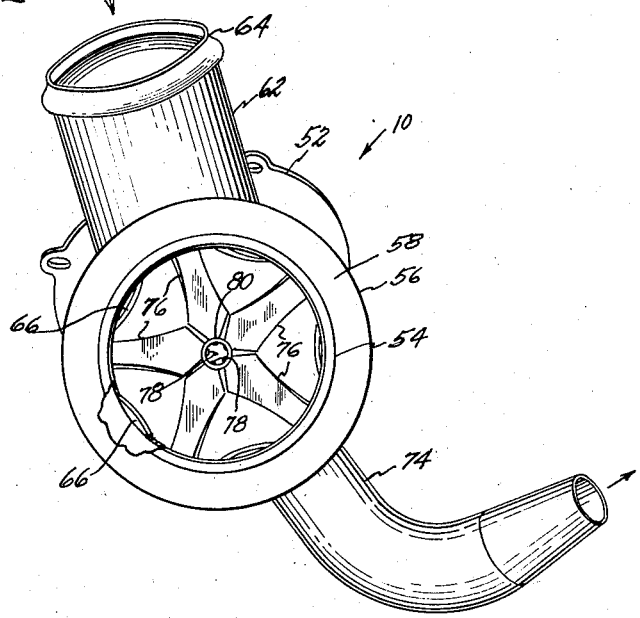
INVENTORS
ROBERT B. GOODMAN
BY FRED J. ROBERTS
Teller + McCormick
ATTORNEYS

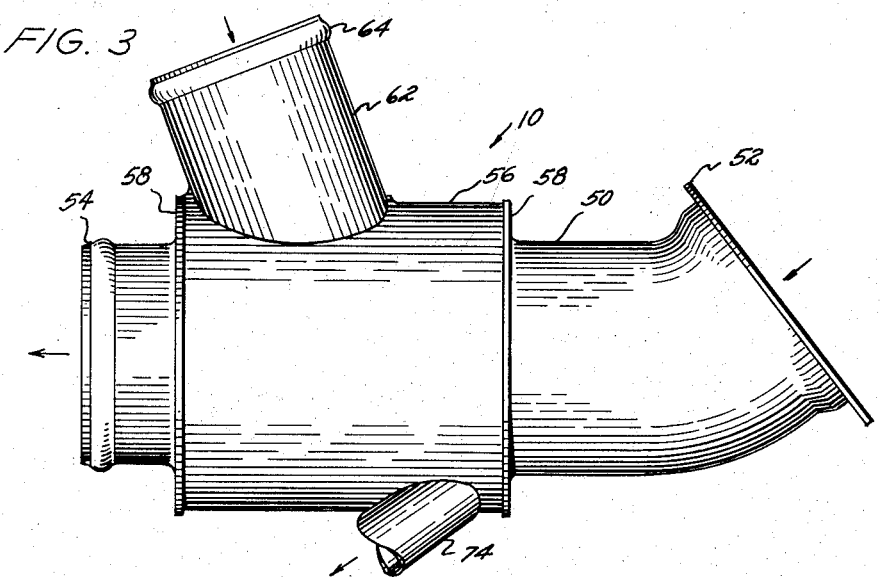
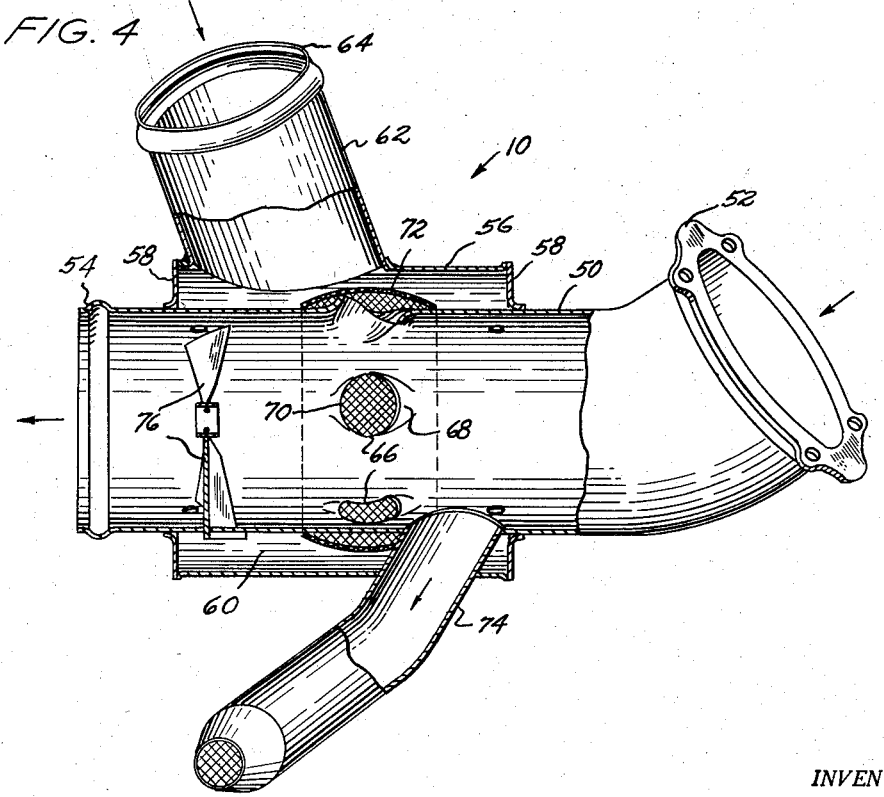

United States Patent Office 2,884,846
Patented May 5, 1959

2,884,846

COUPLING AND MIXING CHAMBER FOR AN AIRCRAFT AIR CONDITIONING SYSTEM

Robert B. Goodman, West Hartford, Conn., and Fred J. Roberts, West Springfield, Mass., assignors to United Aircraft Corporation, East Hartford, Conn., a corporation of Delaware Application December 13, 1956, Serial No. 628,033

2 Claims. (Cl. 98—38)

This invention relates to an aircraft air conditioning system of the type having a plurality of conduits carrying air under pressure at different temperatures and which are connected to mix their contents in controlled proportion before the mixture is introduced to the aircraft cabin or other compartment where temperature controlled air is required. And the invention relates most specifically to the construction of coupling means for effecting a connection between the said conduits and defining a chamber for mixing the air from the conduits.

It is the general object of the invention to provide a conduit coupling which is adapted to effect connection between a plurality of conduits carrying pressurized air at widely different temperatures and which is particularly constructed and arranged to thoroughly mix the contents of the conduits so that readings taken across a wide area outlet of the coupling will indicate a substantially uniform temperature.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings,

Fig. 1 is a schematic view of an aircraft air conditioning system wherein the coupling of this invention is applied to advantage;

Fig. 2 is an end view of the coupling;

Fig. 3 is a side elevational view of the coupling; and

Fig. 4 is a view partly in elevation and partly in longitudinal section of the coupling.

In order that the features and advantages of the present invention can be fully comprehended, attention is invited to the aircraft air conditioning system shown in Fig. 1 and which uses a coupling 10 provided in accordance with this invention. Such an air conditioning system is connectible to the aircraft engine compressor as a source of supply. The conduit 12 which is in communication with the compressor will in a typical installation carry compressed air from the source at high temperature, and the conduit is connected with a heat exchanger 14 wherein the air is initially cooled before discharge through a conduit 16. Under most operating conditions, the air in the conduit 16 will not be sufficiently cool for all purposes of the system, but it may be at a proper temperature for some uses. For example, the conduit 16 may be connected with a windshield de-icing and de-fogging nozzle, not shown. In order that at least a portion of the air supply can be cooled further, a conduit 18 is connected with the "warm" air conduit 16 and with the inlet of a turbine 20. In propelling the turbine and expanding therein, the air gives up heat and is at a relatively low temperature in the turbine discharge conduit 22. The turbine discharge conduit is connected with an inlet to the coupling 10 as will be more fully described hereinafter.

While of no concern in the present invention, it should be observed that the turbine 20 can be used to drive a suction fan 24 which draws cooling air through the heat exchanger 14 from an inlet 26 and discharges air at an outlet 28. The coolant inlet 26 is preferably arranged to receive ram air in normal operation of the aircraft, but under all operating conditions the ram air flow can be supplemented by operation of the fan 24.

The cold air supply provided at the outlet of the turbine 20 is to be mixed at the coupling 10 with hot or warm air in desired proportion before introduction to the aircraft cabin or other compartment at a cabin inlet conduit 30. The hot air supply is transmitted to the coupling 10 through a conduit 32 which is connected with the hot air conduit 12. It may not be desirable to at all times introduce hot air to the coupling and for this reason a warm air supply conduit 34 is also provided and valves 36 and 38 are disposed in the conduits 32 and 34 respectively to control flow therethrough. It will be observed that the conduit 34 is connected between the warm air conduit 16 and the hot air conduit 32 on the downstream side of the valve 36 therein. Therefore, adjustment of the valves 36 and 38 can be effected to select either hot air or warm air or a mixture thereof for introduction to the coupling 10 through the conduit 32.

Preferably, the valves 36 and 38 are operated by actuating means responsive to cabin temperature, or more specifically, responsive to change in the temperature of the air mixture introduced to the cabin. That is, means are preferably provided for sensing a change in cabin temperature or in the temperature of the air introduced thereto and for operating one or both of the said valves to change the hot and cold proportion of the mix to maintain a selected or desired temperature in the cabin. Valve actuating means adapted for this purpose is shown and described in the application Serial No. 628,087, now U.S. Patent 2,854,913 of Charles B. Brahm, filed of even date herewith and entitled "Flow Control Means for an Aircraft Air Conditioning System" to which reference may be had. Any type of temperature responsive valve actuating means employed will necessarily require means sensing temperature and changes in temperature of the air either in the cabin or before it is introduced to the cabin.

In the preferred form shown, one or more temperature sensing devices 40, 40 are disposed in the cabin inlet conduit 30 adjacent to but nonetheless downstream of the coupling 10. In order for the entire temperature responsive mechanism to function properly and to control cabin temperature within close limitations, it is essential that the air be thoroughly mixed at the coupling 10 whereby the sensors 40, 40 will react to the temperature of the mixture and not to the temperature of a portion or constituent thereof. The coupling 10 provided in accordance with this invention is adapted to thoroughly mix the air from the cold air conduit 22 and from the hot air conduit 32.

The said coupling 10 as shown in Figs. 2, 3 and 4 comprises a main conduit section 50 which is adapted at one end 52 for direct connection with the cold air conduit 22 and which is adapted at the other end 54 for direct connection with the cabin inlet conduit 30. For convenience, the end 52 will be referred to as the upstream end and the end 54 will be referred to as the downstream end. A generally cylindrical shell or jacket 56 surrounds the conduit section 50 between its ends and the ends of the shell are closed by annular headers 58, 58 which are secured to the conduit section 50 as by welding or the like whereby to define an annular chamber 60 around the said conduit section. A conduit fitting 62 having an open end 64 which is adapted for direct connection with the hot air conduit 32 is secured to the shell 56 at an oblique angle and so arranged that the hot air flow entering the chamber 60 is directed slightly upstream with respect to the cold air flow in the conduit section 50.

The annular chamber 60 defined within the shell 56 comprises a diffusing chamber for the hot air stream. The hot air from the chamber 60 is introduced to the main conduit section 50 for flow to the cabin inlet through a plurality of circumaxially spaced generally circular openings 66, 66 in the wall of the conduit section 50. In the embodiment of the invention shown, there are five openings 66 provided which are equally circumaxially spaced and, preferably, no less number should be provided. While the total number of openings 66 provided around the conduit section 50 is not critical, it is important to shape each opening as shown. That is, the upstream side or lip 68 of each opening 66 is bent inwardly of the conduit 50 and the downstream side or lip 70 of each opening 66 is bent outwardly into the chamber 60. It is also important to locate the openings 66, 66 in the conduit 50 slightly upstream with respect to the center line of the hot air conduit fitting 62, all of this to provide for greater diffusion of the hot air within the chamber 60 before it is introduced to the main conduit section 50. It has been found that diffusion of the hot air is enhanced by providing a relatively fine mesh screen 72 surrounding the openings or ports 66, 66, the screen 72 being welded to the conduit 50.

It has been determined that the most thorough mixing of the cold and hot air can be accomplished within the conduit section 50 if the hot air is diffused before it is introduced to the said conduit. Thus, the hot air is not permitted to pass directly into the center of the cold air stream carried in the conduit 50. Preferably, the hot air immediately upon introduction to the conduit section 50 is carried therealong in a boundary layer surrounding the cold air stream which enters the conduit at its end 52. It has been found that the hot and cold air can be more thoroughly mixed on the downstream side of the hot air openings 66, 66 by mixing the boundary layer with the central cold air stream. By diffusing the hot air in the chamber 60 and by introducing it through the plurality of circumaxially spaced ports 66, 66 which are shaped as described, the desired boundary layer of hot air is provided on the downstream side of said openings.

In the specific embodiment of the invention shown, there is a relatively small diameter conduit 74 provided which extends through the shell or jacket 56 at an oblique angle and opens into the conduit 50 adjacent to but on the upstream side of the circumaxial openings 66, 66. The conduit 74 is so arranged that its inner end faces slightly upstream in the main conduit 50. The reduced diameter conduit 74 serves no purpose in mixing the hot and cold air within the coupling 10 and it is provided to discharge some of the cold air entering the coupling. That is, the reduced diameter conduit 74 is provided as a cold air supply conduit to a compartment wherein the coupling 10 and at least some of the other elements of the air conditioning system are located. The cold air supply conduit 74 will not be incorporated in all constructions of the coupling 10 and is provided only when it is necessary to supply some compartment in addition to the cabin with cold air.

The means for thoroughly mixing the boundary layer of hot air with the cold air stream in the conduit 50 on the downstream side of the hot air openings 66, 66, comprises a plurality of circumaxially spaced vanes 76, 76 which are secured transversely of the conduit. It will be observed that each vane 76 is twisted along its length whereby to direct higher density cold air from the central portion of the stream outwardly to the lower density hot air in the boundary layer for thorough intermixing. Preferably, the vanes 76, 76 are provided with pointed inner ends each having a projection 78 which can be extended through a suitable opening in a ring 80 whereby all of the vanes are supported at their inner ends on the said ring. This construction permits the vanes 76, 76 to be assembled in equally circumaxially spaced relationship by being thrust through suitable slots in the wall of the conduit 50, the outer ends of the vanes being welded within the slots and the inner projections 78, 78 of the vanes being welded in the ring 80.

It has been found that the arrangement of the hot air diffusing jacket 56 and the arrangement of the openings 66, 66 for introducing the hot air to the main conduit 50 in a boundary layer for mixture with the cold air stream by the mixing vanes 76, 76 provides for a very thorough mixing action whereby the temperature sensors 40, 40 located adjacent the downstream end 54 of the coupling will sense the true temperature of the mixture in keeping with cabin temperature.

The invention claimed is:

1. A coupling for interconnecting hot and cold air supply conduits in an aircraft air conditioning system and for mixing their air streams to provide a substantially uniform temperature mixture, the said coupling comprising a main conduit section having an upstream end for connection to the cold air supply conduit and having a downstream end for connection to the inlet means of the aircraft cabin or compartment, a generally cylindrical closed shell surrounding the conduit section and defining an annular chamber therearound, an inlet conduit fitting for connection with the hot air supply conduit opening into said shell at an oblique angle facing upstream with respect to said conduit section, the said conduit section being provided with a plurality of circumaxially spaced openings within said shell and chamber, the upstream side of each opening being bent inwardly of the conduit section and the downstream side of each opening being bent outwardly of said conduit section, and said openings being located around said conduit section adjacent to but upstream of the opening of the said conduit fitting, and a plurality of circumaxially spaced longitudinally twisted vanes secured generally transversely in said conduit section on the downstream side of the said openings.

2. A coupling for interconnecting hot and cold air supply conduits in an aircraft air conditioning system and for mixing their air streams to provide a substantially uniform temperature mixture, the said coupling comprising a main conduit section having an upstream end for connection to the cold air supply conduit and having a downstream end for connection to the inlet means of the aircraft cabin or compartment, a generally cylindrical closed shell surrounding the conduit section and defining an annular chamber therearound, an inlet conduit fitting for connection with the hot air supply conduit opening into said shell at an oblique angle facing upstream with respect to said conduit section, the said conduit section being provided with a plurality of circumaxially spaced openings within said shell and chamber, the upstream side of each opening being bent inwardly of the conduit section and the downstream side of each opening being bent outwardly of said conduit section, and said openings being located around said conduit section adjacent to but upstream of the opening of the said conduit fitting, a diffusing screen surrounding said openings within said chamber, and means for mixing hot and cold air within said conduit section comprising a plurality of circumaxially spaced longitudinally twisted vanes which are disposed substantially transversely of the conduit section and have their outer ends secured to said conduit section, and a ring connecting the inner ends of said vanes to retain the same in said circumaxially spaced position.

References Cited in the file of this patent

UNITED STATES PATENTS

| | | |
|---|---|---|
| 1,689,433 | Harvey | Oct. 30, 1928 |
| 1,689,446 | Miller et al. | Oct. 30, 1928 |
| 2,572,338 | Hartwig et al. | Oct. 23, 1951 |